US010802114B2

(12) United States Patent
Ruffo et al.

(10) Patent No.: US 10,802,114 B2
(45) Date of Patent: Oct. 13, 2020

(54) DEVICE AND METHOD FOR UNIFORM FAR-FIELD ILLUMINATION WITH LEDS

(71) Applicant: Terabee SAS, Saint-Genis-Pouilly (FR)

(72) Inventors: Massimiliano Ruffo, Chêne-Bougeries (CH); Jan W Kovermann, Valleiry (FR)

(73) Assignee: Terabee SAS, Saint-Genis-Pouilly (FR)

( * ) Notice: Subject to any disclaimer, the term of this patent is extended or adjusted under 35 U.S.C. 154(b) by 435 days.

(21) Appl. No.: 15/571,506

(22) PCT Filed: May 17, 2016

(86) PCT No.: PCT/EP2016/060998
§ 371 (c)(1),
(2) Date: Nov. 3, 2017

(87) PCT Pub. No.: WO2016/184844
PCT Pub. Date: Nov. 24, 2016

(65) Prior Publication Data
US 2019/0129011 A1 May 2, 2019

(30) Foreign Application Priority Data
May 18, 2015 (EP) .................................... 15305739

(51) Int. Cl.
G01C 3/08 (2006.01)
G01S 7/481 (2006.01)
(Continued)

(52) U.S. Cl.
CPC .............. G01S 7/4815 (2013.01); F21K 9/00 (2013.01); G01S 17/42 (2013.01); G01S 17/89 (2013.01);
(Continued)

(58) Field of Classification Search
CPC ...... G01S 7/4815; G01S 17/89; G01S 17/894; G01S 17/42
(Continued)

(56) References Cited

U.S. PATENT DOCUMENTS 5,552,893 A * 9/1996 Akasu ....................... G01C 3/00
356/4.01
6,654,399 B1 * 11/2003 Kimura ................. G01S 7/4815
372/50.1
(Continued)

FOREIGN PATENT DOCUMENTS

EP 1710493 A2 10/2006
JP 2002373508 12/2002
(Continued)

OTHER PUBLICATIONS

International Search Report of PCT/EP2016/060998 dated Sep. 29, 2016.
(Continued)

Primary Examiner — Mark Hellner
(74) Attorney, Agent, or Firm — Andre Roland S.A.; Nikolaus Schibli

(57) ABSTRACT

A light source for illuminating a selected surface, the light source comprising a plurality of Light Emitting Diodes (LED) mounted on a substrate; each of the plurality of LEDs having an optical axis and generating a radiation pattern propagating along the optical axis. The plurality of LEDs are arranged so that each optical axis is oriented substantially towards a determined far-field central point; and the plurality of LEDs provide a predetermined irradiance distribution on the selected surface. Each of the radiation patterns defines a preferential direction; and each of the plurality of LEDs is arranged so that the preferential direction of each of the plurality of LEDs is unique.

18 Claims, 4 Drawing Sheets

(51) Int. Cl.
*G01S 17/89* (2020.01)
*F21K 9/00* (2016.01)
*G01S 17/42* (2006.01)
*F21Y 105/12* (2016.01)
*F21Y 105/18* (2016.01)
*F21Y 105/16* (2016.01)
*F21Y 103/10* (2016.01)
*F21Y 115/10* (2016.01)
*F21V 21/00* (2006.01)

(52) U.S. Cl.
CPC .......... *F21V 21/00* (2013.01); *F21Y 2103/10* (2016.08); *F21Y 2105/12* (2016.08); *F21Y 2105/16* (2016.08); *F21Y 2105/18* (2016.08); *F21Y 2115/10* (2016.08)

(58) Field of Classification Search
USPC ........................................................ 356/5.01
See application file for complete search history.

(56) References Cited

U.S. PATENT DOCUMENTS

| | | | |
|---|---|---|---|
| 2004/0085766 | A1 | 5/2004 | Chen |
| 2006/0221613 | A1 | 10/2006 | Coushaine et al. |
| 2008/0123057 | A1* | 5/2008 | Williamson ....... G03B 21/2013 353/30 |
| 2010/0020306 | A1* | 1/2010 | Hall ....................... H01S 5/0428 356/5.01 |
| 2013/0211657 | A1* | 8/2013 | Zeng ..................... G01S 17/931 701/28 |
| 2015/0055678 | A1 | 2/2015 | Kawata |
| 2015/0332102 | A1* | 11/2015 | Lu ........................... G01S 17/89 348/222.1 |
| 2016/0082877 | A1 | 3/2016 | Oberhammer et al. |

FOREIGN PATENT DOCUMENTS

| | | |
|---|---|---|
| WO | WO2008/066785 A2 | 6/2008 |
| WO | WO2014/180856 A2 | 6/2008 |
| WO | WO2011/032300 A1 | 3/2011 |

OTHER PUBLICATIONS

Written Opinion of the International Search Authority dated Sep. 29, 2016 for PCT/EP2016/060998.
Eropean Office Notification 94(3) dated Feb. 3, 2020 for application EP 16 729 792.8.

* cited by examiner

DEVICE AND METHOD FOR UNIFORM FAR-FIELD ILLUMINATION WITH LEDS

CROSS REFERENCE TO RELATED APPLICATIONS

The present application is a United States national stage application of International patent application PCT/EP2016/060998 filed on May 17, 2016 designating the United States, and claims foreign priority to European patent application EP 15305739.3 filed on May 18, 2015, the contents of both documents being herewith incorporated by reference in their entirety.

TECHNICAL FIELD

The present invention relates to the field of Light Emitting Diode (LED) lighting, and more particularly to uniform field illumination by LEDs. In particular the invention is directed to LED light sources for use in the field of Time of Flight cameras and/or 3D cameras.

PRIOR ART

A LED is a wide band non-coherent light source. Due to the simple LED structure, easy modulation, and good reliability, LEDs are widely used in various technical fields.

However, LEDs do not always approximate well as a point source of light giving a spherical light distribution. Thus LEDs can be difficult to apply to uses needing a spherical light field or a homogenous surface lighting. In order to overcome this drawback, the light source of the LED is usually manipulated by the application of different optics, reflectors, mirrors, diffusers, lenses, etc.

As an example, we can cite focused LEDs which rely on parabolic reflectors for achieving small opening angles (for example ±10°). Optical properties of the parabolic reflectors may lead to very long depths of field, resulting in non-uniformities in the far field illumination. Furthermore, the non-uniformities may also be a magnified image of internal structural characteristics of the LED. Geometrical factors of the different components, i.e., LED, mirror, lenses, bonding wire(s) etc., can also have an impact on the luminance uniformity of a surface to be illuminated.

One aim of the invention is to provide a uniform far-field illumination with LEDs without the need of specific optics, reflectors, mirrors, diffusers, lenses, etc.

SUMMARY OF THE INVENTION

The present invention provides a light source being capable of illuminating a certain region (called selected surface hereafter) with a highly uniform illuminance of the selected surface.

The invention provides a method to achieve a homogenous beam without the need of additional optics such as for example reflectors, lenses, condensers, . . . .

LED lighting systems with condenser lenses usually render a uniform illumination. However, due to the use of optics, light intensity losses are usually observed.

The elimination of the need for external optics significantly simplifies manufacturing processes and the weight of the light source.

In a first aspect the invention provides a light source for illuminating a selected surface, the light source comprising a plurality of Light Emitting Diodes (LED) mounted on a substrate; each of the plurality of LEDs having an optical axis and generating a radiation pattern propagating along the optical axis. The plurality of LEDs are arranged so that each optical axis is oriented substantially towards a determined far-field central point; and the plurality of LEDs provide a predetermined irradiance distribution on the selected surface. Each of the radiation patterns defines a preferential direction; and each of the plurality of LEDs is arranged so that the preferential direction of each of the plurality of LEDs is unique.

In a preferred embodiment the plurality of LEDs are arranged in a linear array.

In a further preferred embodiment the plurality of LEDs are arranged in a matrix.

In a further preferred embodiment the plurality of LEDs are arranged in a ring.

In a further preferred embodiment the plurality of LEDs comprises at least an infra-red range LED.

In a further preferred embodiment each angle between two preferential directions is a multiple of 360° divided by a total number of the plurality of LEDs.

In a second aspect, the invention provides a method for producing a light source, comprising the steps of selecting a plurality of Light Emitting Diodes (LED); determining for each of the plurality of LEDs an orientation of its optical axis; and determining for each of the plurality of LEDs an orientation of its preferential direction. The method further comprises positioning a plurality of LEDs on a substrate so that each optical axis is directed substantially onto a determined far-field central point; and the preferential direction of each of the plurality of LEDs is unique.

In a further preferred embodiment, the method comprises a step of positioning the plurality of LEDs in a linear array.

In a further preferred embodiment, the method comprises a step of positioning the plurality of LEDs in a matrix.

In a further preferred embodiment, the method comprises a step of positioning the plurality of LEDs in a ring.

In a further preferred embodiment, each angle between two preferential directions is a multiple of 360 divided by a total number of the plurality of LEDs.

In a third aspect, the invention provide a sensor comprising the light source according to the first aspect described herein above.

In a third aspect, the invention provides a time-of-Flight sensor comprising the light source according to the first aspect described herein above.

In a fourth aspect, the invention provides a camera comprising the light source according to the first aspect described herein above.

In a fifth aspect, the invention provides a 3D camera comprising the light source according to the first aspect described herein above.

In a sixth aspect, the invention provides a Time-of-Flight camera comprising the light source according to the first aspect described herein above.

BRIEF DESCRIPTION OF THE FIGURES

The invention will be better understood through the description of preferred embodiments while referring to figures, as listed herein below.

DESCRIPTION OF PREFERRED EMBODIMENTS

In order to better understand the invention, a specific physical property of a LED which has a significant influence on non-uniformities in the far field illumination needs to be presented: the spatial radiation characteristics.

It is well known that each LED has a specific spatial radiation. Spatial radiation can be described through a pattern of relative light strength in any direction from the light source.

LED spatial radiation has been studied and has shown that spatial radiation repartition is either lambertian or non-lambertian. A specific spatial radiation repartition generates a specific irradiance distribution pattern on a selected surface to be illuminated. Many different irradiance distribution patterns have been observed: bat wings, parabolic, hemispherical shapes among others. For a given chemical composition and geometry of the semiconductor, chip spatial radiation and related irradiance distribution patterns can be simulated.

In addition, several factors can influence the spatial radiation pattern. Among other factors there is the internal structure/crystal orientation of the semiconductor chip. For example, within production tolerances, crystalline defects or chemical composition can slightly deviate the semi-conductor chip from its ideal structure, mechanical and optical axes may not be coincident, parabolic reflectors may have imperfections, etc. Therefore, even within LEDs from a same production, differences are often observed in the effective spatial radiation pattern P. The far-field irradiance distribution pattern of a LED E is influenced by all above mentioned features/factors.

Figure 1:
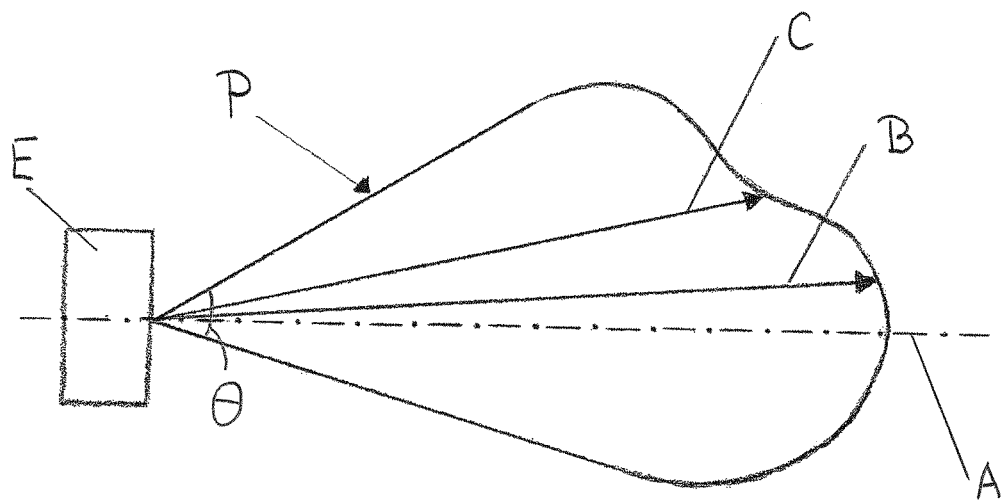
FIG. 1 contains a schematic representation of a radiation pattern.

As can be seen in the schematic representation of FIG. 1, an LED E emits a radiation pattern P which can show up to 3 axis. The axis A is a center line of the LED E. The actual optical axis C is a weighted average center line. The axis of maximum brightness B is the direction of the brightest emittance. A radiation pattern P has a specific diffusion angle $\theta$ which is may for example be between 2° and 45° depending of the LED characteristics.

Figure 2:
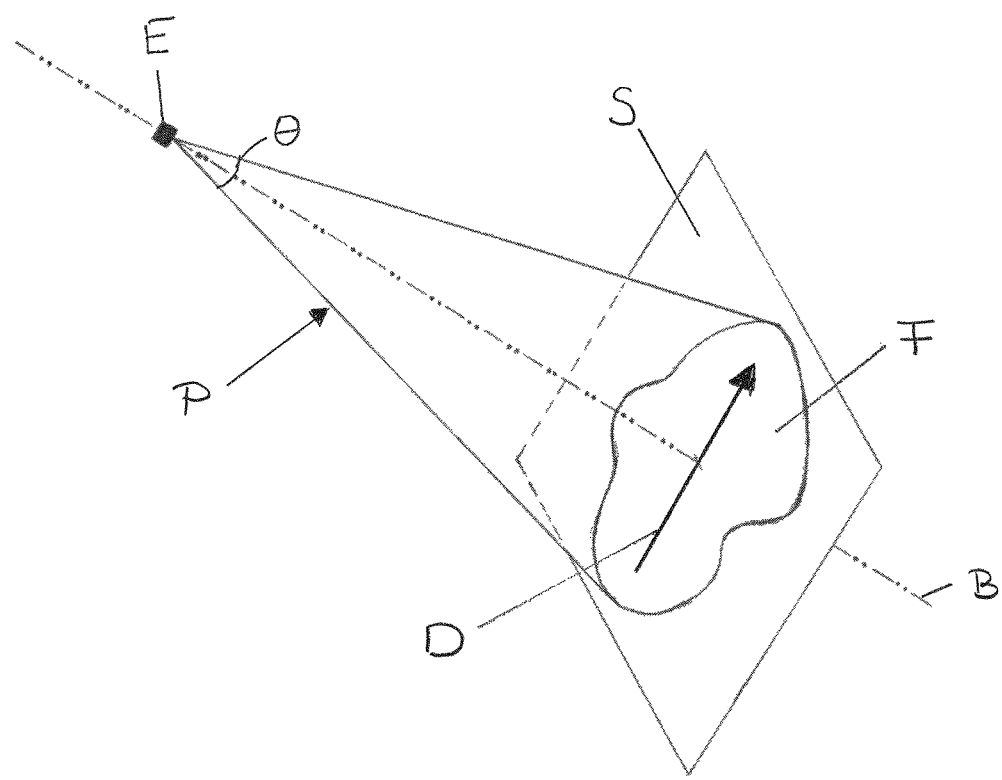
FIG. 2 is a schematic representation of a radiation pattern (P) with its related irradiance distribution pattern (F)

FIG. 2 is a schematic representation of a radiation pattern P with its related irradiance distribution pattern F on a selected surface S to be illuminated. The irradiance distribution pattern F shows irregularities on the selected surface S. The spatial radiation pattern P—with its corresponding irradiance distribution pattern F—defines a shape which has a preferential direction D.

The term preferential direction of a LED is defined as an orientation of the LED's spatial radiation pattern which is linked to physical and geometrical properties of the LED. The preferential direction is inherent to physical and geometrical constraints in the manufacturing of the LED that lead the spatial radiation pattern not to be an ideal cone that would be emitted by a point light source, but instead have a spatial radiation pattern that is emitted from an non-punctual shaped light source. This will be better understood through the following examples: in a perfect circle with homogenous irradiance, there is no preferential direction; in a perfect circle with non-homogenous irradiance, the preferential direction can be found from the orientation of the intensity of the illuminance on the surface.

In order to mitigate illumination defect, or differently expressed, in order to achieve a homogenous beam, instead of using dedicated optics, the specificity of the LED radiation pattern P can be used. This will be explained in more detail hereafter.

By positioning the LEDs on a substrate with their optical axis C oriented to a surface to be illuminated and with their preferential direction D in pre-determined direction, the non-uniformity of the luminance on a surface to be illuminated is averaged resulting in a more homogeneous lighting.

The invention proposes a method for defining a repartition pattern of the preferential directions D of the LEDs on a substrate.

Multiple identical or similar LEDs are positioned on a substrate either in a linear array, in a matrix or in a ring—or any other shape—in such a way that each LED is rotated by a certain angle in respect to the previous one.

In a preferred embodiment the certain angle is calculated by dividing 360° by the number of LEDs used. In another preferred embodiment, the certain angle follows a random pattern. Any in-between solution in order to override the effect of the impurity of each single LED light cone may also be used.

Figure 3:
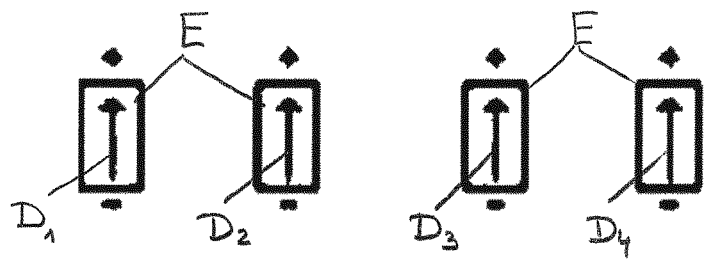
FIG. 3 illustrates an array of 4 LEDs oriented in the same direction.
Figure 4:
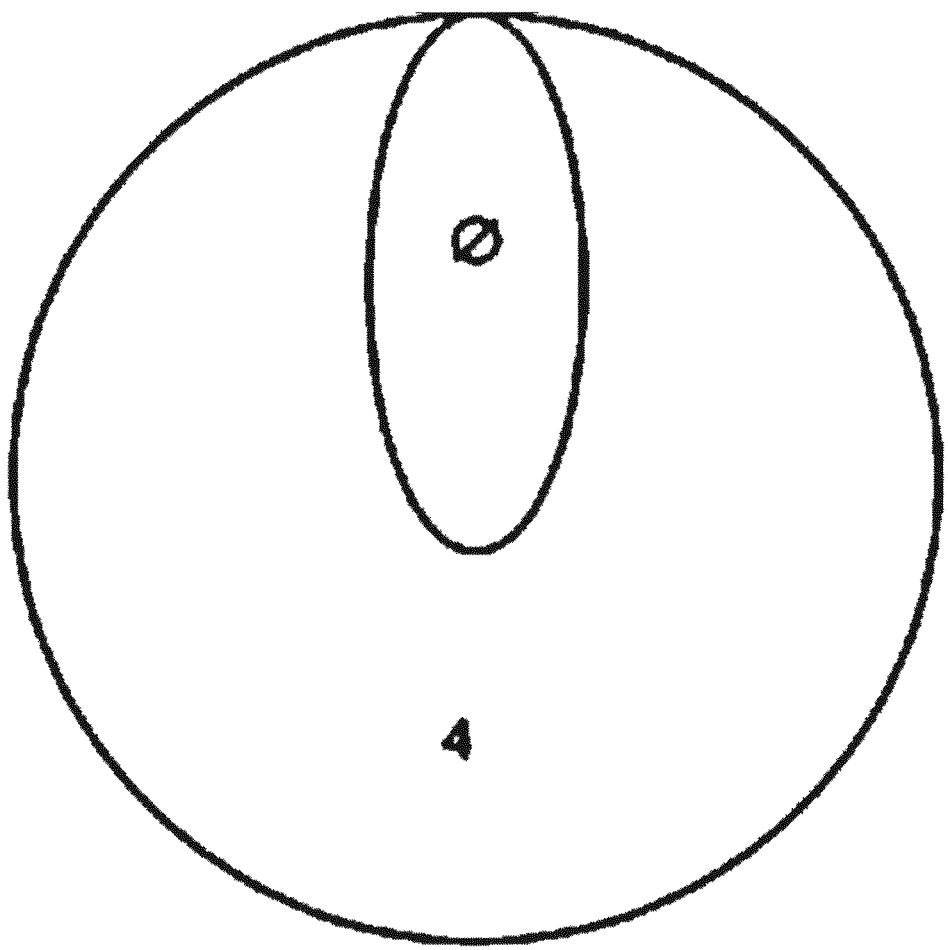
FIG. 4 illustrates an example of a schematic projection of the illumination of the LED configuration of FIG. 3.

Experience has shown that an angular tolerance of for example 25% is permissible.

Where 4 LEDs are mounted in an array with substantially the same preferential directions $D_1$, $D_2$, $D_3$ and $D_4$ as represented in FIG. 3, an example of an irradiance distribution pattern is schematically represented in FIG. 4. The portion of a selected surface marked with Ø, indicates that this portion is not illuminated at all by any of the LED. The other portion, marked with a 4, is illuminated by the 4 LEDs.

Figure 5:
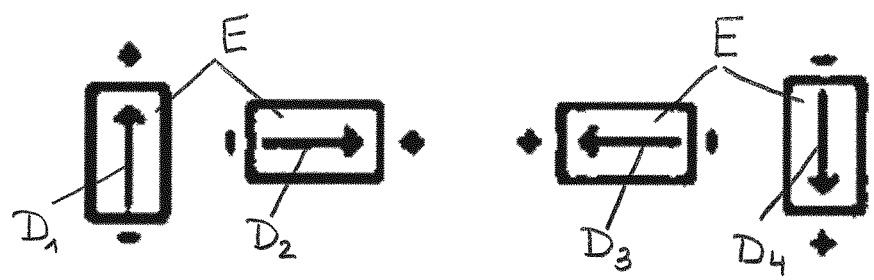
FIG. 5 illustrates an array of 4 LEDs directionally mounted.
Figure 6:
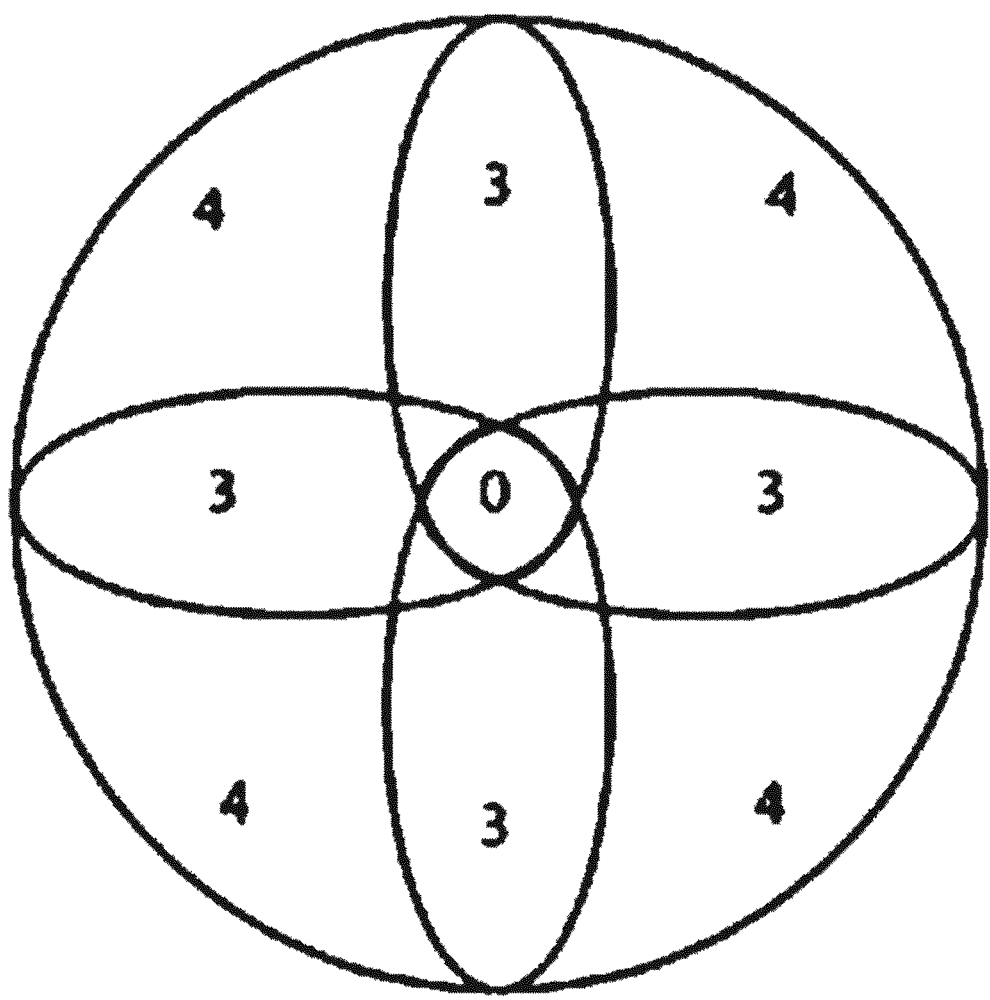
FIG. 6 illustrates an example of a schematic projection of the illumination of the LED configuration of FIG. 5.

With reference to FIGS. 5 and 6, four LEDs are positioned on a substrate with their preferential directions $D_1$, $D_2$, $D_3$ and $D_4$ distributed in four different directions. The angle between one preferential direction $D_n$ and the subsequent preferential direction $D_{n+1}$ is of 90°. The irradiance distribution pattern is schematically represented in FIG. 5. 0 indicates a portion of a selected surface which is not illuminated by any of the four LEDs. 3 are portions of a selected surface illuminated by three of the four LEDs and 4 is a portion of a selected surface illuminated by all four LEDs.

Figure 7:
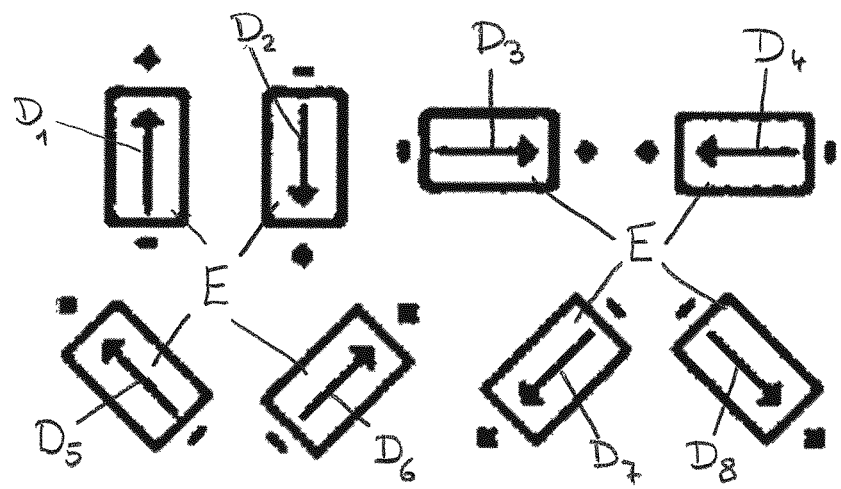
FIG. 7 illustrates a bi-directional array of 8 LEDs all in different directions.
Figure 8:
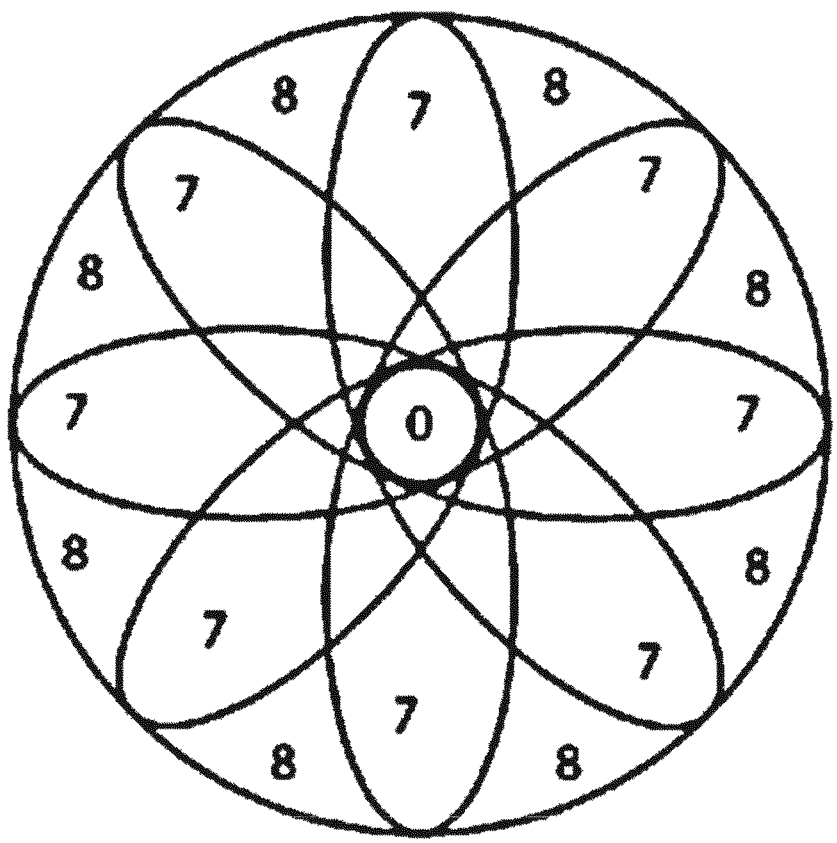
FIG. 8 illustrates an example of a schematic projection of the illumination of the LED configuration of FIG. 7.

With reference to FIGS. 7 and 8, eight LEDs are positioned on a substrate with their preferential directions $D_1, \ldots, D_8$ distributed in eight different directions. The angle between one preferential direction $D_n$ and the subsequent preferential direction $D_{n+1}$ is of 45°. The irradiance distribution pattern is schematically represented in FIG. 7. 0 indicates a portion of a selected surface which is not illuminated by any of the four LEDs. 7 are portions of a selected surface illuminated by seven of the eight LEDs and 8 is a portion of a selected surface illuminated by all eight LEDs.

It is easily understood that the effect of non-uniformity correction increases with the amount of LEDs used.

Using this method, a more uniform illumination is obtained. This method brings several advantages for several applications in optical imaging, ranging from illumination issues in the visible wavelength range—e.g., for photography—up to the use in the infra-red range, which is used for Time-of-Flight sensors and cameras.

Narrow beam emitting LEDs with wire bonding are particularly adapted for this method. However, the method is not limited to this kind of LEDs—wide angles or LEDs without bonding can also be used without problem.

The same concept can be extended to any other wavelength where LEDs illumination embeds some non-uniformity. It can also be applied to sets of LEDs, such as blue-green-red LEDs used to obtain white light.

The invention is not limited to the examples mentioned, and may be used in conjunction with any other technology where LEDs illumination can be used.

The invention claimed is:

1. A light source for illuminating a surface, the light source comprising:
    a plurality of light emitting diodes (LEDs) each mounted on a substrate with an orientation direction, each one of the plurality of LEDs have an optical axis, the plurality of LEDs are arranged such that each optical axis is oriented substantially towards a determined far-field central point,
    wherein each one of the plurality of LEDs are configured to generate an illuminated area that has an irradiance distribution pattern when illuminating a surface that is placed in the optical axis, each one of the irradiance distribution patterns forming a shape having an orientation with a preferential direction, the preferential direction caused by properties of the respective LED, and
    wherein each one of the plurality of LEDs is geometrically oriented relative to the substrate such that the preferential direction that is generated by each one of the plurality of LEDs is different irrespective of the orientation direction of each one of the plurality of light emitting diodes.

2. The light source according to claim 1, wherein the plurality of LEDs are arranged in a linear array on the substrate.

3. The light source according to claim 1, wherein the plurality of LEDs are arranged in a matrix on the substrate.

4. The light source according to claim 1, wherein the plurality of LEDs are arranged in a ring on the substrate.

5. The light source according to claim 1, wherein the plurality of LEDs include at least one infra-red range LED.

6. The light source according to claim 1, wherein the geometric orientation of each LED is such that each angle between two preferential directions is a multiple of 360 degrees divided by a total number of the plurality of LEDs.

7. A method for producing a light source, comprising the steps of:
    selecting a plurality of Light Emitting Diodes (LEDs);
    determining for each of the plurality of LEDs a direction of a corresponding optical axis;
    determining for each of the plurality of LEDs an orientation of a corresponding preferential direction, the preferential direction being a direction of orientation of a shape formed by an irradiance distribution pattern that is caused when the respective LED is illuminating a surface that is placed in the optical axis, the preferential direction caused by properties of the respective LED;
    positioning a plurality of LEDs on a substrate so that each optical axis is directed substantially towards a determined far-field central point; and
    geometrically orientating the plurality of LEDs relative to the substrate such that the preferential directions of each of the plurality of LEDs are different irrespective of the orientation direction of each one of the plurality of light emitting diodes.

8. The method for producing a light source according to claim 7, further comprising:
    positioning the plurality of LEDs in a linear array on the substrate.

9. The method for producing a light source according to claim 7, further comprising:
    positioning the plurality of LEDs in a matrix on the substrate.

10. The method for producing a light source according to claim 7, further comprising:
    positioning the plurality of LEDs in a ring on the substrate.

11. The method for producing a light source according to claim 7, wherein the geometric orientation of each LED is such that each angle between two preferential directions is a multiple of 360 degrees divided by a total number of the plurality of LEDs.

12. A sensor comprising the light source of claim 1.

13. A time-of-flight sensor comprising the light source according to claim 1.

14. A camera comprising the light source according to claim 1.

15. A 3D camera comprising the light source according to claim 1.

16. A time-of-flight camera comprising the light source according to claim 1.

17. The light source according to claim 1, wherein the irradiance distribution pattern is linked to physical and geometrical properties of the respective LED and is inherent to physical and geometrical constraints in manufacturing of the respective LED, and leads the irradiance distribution radiation pattern not to be an ideal cone that would be emitted by a point light source.

18. The method for producing a light source according to claim 7, wherein the irradiance distribution pattern is linked to physical and geometrical properties of the respective LED and is inherent to physical and geometrical constraints in manufacturing of the respective LED, and leads the irradiance distribution radiation pattern not to be an ideal cone that would be emitted by a point light source.

* * * * *